Nov. 5, 1957　　　P. G. HYKES ET AL　　　2,812,216
WHEEL HUB, DISK, AND BRAKE DRUM ASSEMBLY

Filed March 4, 1954　　　　　　　　　　　　　2 Sheets-Sheet 1

INVENTORS
Paul G. Hykes
Winslow B. Pope.
BY William R. Ghison
ATTORNEY

Nov. 5, 1957  P. G. HYKES ET AL  2,812,216
WHEEL HUB, DISK, AND BRAKE DRUM ASSEMBLY
Filed March 4, 1954  2 Sheets-Sheet 2

INVENTORS
Paul G. Hykes
Winslow B. Pope
BY
William R. Glisson
ATTORNEY

United States Patent Office 2,812,216
Patented Nov. 5, 1957

2,812,216

WHEEL HUB, DISK, AND BRAKE DRUM ASSEMBLY

Paul G. Hykes, Grosse Pointe, and Winslow B. Pope, Detroit, Mich., assignors to The Budd Company, Philadelphia, Pa., a corporation of Pennsylvania Application March 4, 1954, Serial No. 414,203

1 Claim. (Cl. 301—105)

This invention relates to wheel hub, disk, and brake drum assembly, especially to a hub construction which provides improved securement of the disk and drum to the hub flange and improved seating of the drum on the flange, and has for an object the provision of improvements in this art.

One of the particular objects of the invention is to provide a hub construction in which seating means for the brake drum are provided at a distance from the bolt hole locations for the bolts which secure the disk and drum to the hub disk, whereby the seating means are disposed outside the stress zones around the bolt holes and excessive cracks and breakage are avoided.

The above and other objects and advantages will be apparent from the following description of an illustrative embodiment in which.

Figure 1:
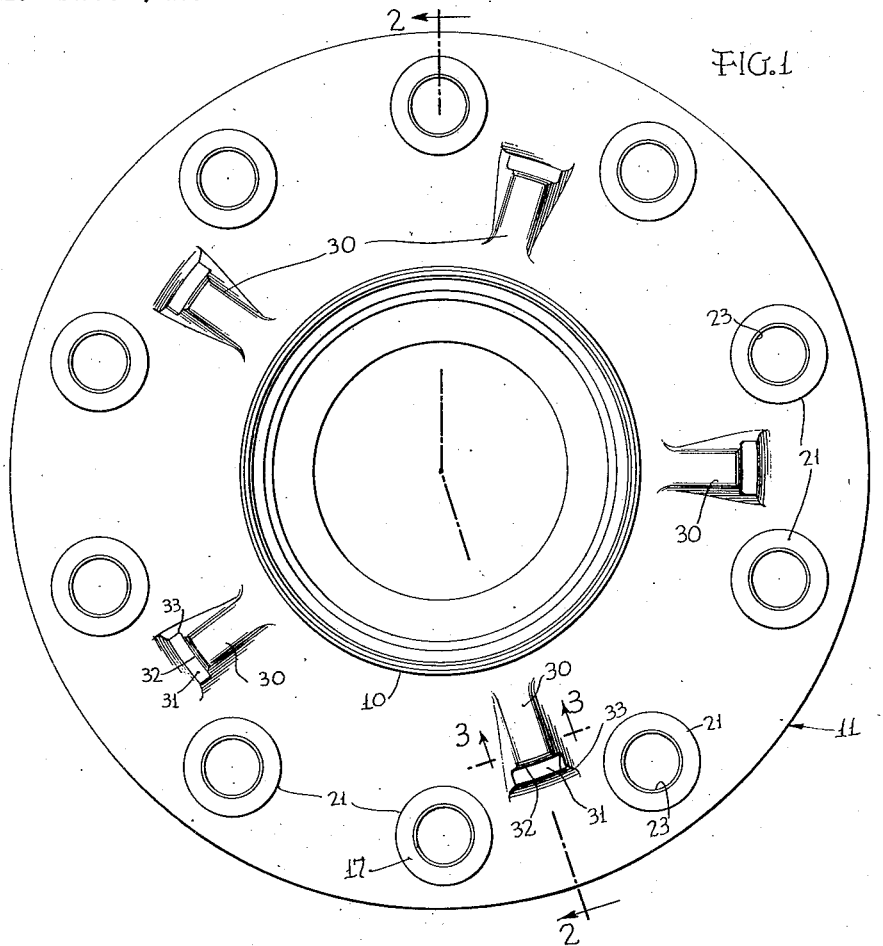
Fig. 1 is a side elevation of a wheel hub embodying the invention, the view being taken looking at the drum engaging side of the hub flange.

Commonly, wheel hub flanges have brake drum positioning lugs formed as an integral part of the flange and located adjacent the wheel attaching bolt holes. These lugs or bosses, being disposed within the zone of high stress concentration and necessarily having a small-radius machined corner for the proper locational assembly and piloting of the brake drum, are subject to a resultant "notch effect" which induces the formation of cracks at the points of high stress concentration and often leads to failure in breakage.

According to the present invention, the positioning lugs or bosses are placed at such a distance from the bolt holes that they are outside the zones of high stress concentration and it has been found that the life of the hub without fatigue failure has been very greatly increased.

As shown in the drawings, the hub 10 has its flange 11 formed with a flat face 12 on one side to cooperate with a corresponding flat inner face 13 of a wheel disk 14 and is formed with a flat surface 17 on the other side to cooperate with a corresponding flat face 18 formed on the inner flange 19 of a brake drum 20.

A number of bolt holes 23 are formed in the hub flange 11 to mate with corresponding holes 24 and 25 in the disk, and drum flange, respectively, to receive the attaching bolts 26. The disk is piloted into accurate position by any suitable means and is secured by nuts 27 threaded on the bolts. The nuts may act both as piloting and securing means, if desired. There are ten holes and bolts in the embodiment illustrated.

The brake drum is piloted accurately into proper position by a number of lugs or bosses 30 formed integrally on the hub flange 11. The lugs 30 have radially flat surfaces 31 engaged by the flat end surface 18 of the drum flange. These surfaces 31 lie on a common plane with the surface 17, previously mentioned, which here is formed on the ends of a number of annular bosses 21 around the bolt holes rather than being made as a continuous uninterrupted entity.

The lugs or bosses 30 also have arcuate axially directed surfaces 32 upon which the inner edge of the brake drum flange is positioned. The inner corners between the radial surfaces 31 and axial surfaces 32 are rounded on the arc of a small circle 33 and the inner edges of the drum flange are also suitably rounded or chamfered.

There are at least three drum positioning lugs to define a concentric circular positioning line and usually there are more than three but it has been found that satisfactory service can be obtained without having as many positioning lugs as there are attaching bolts. In the illustrated form there are only half as many positioning lugs as there are bolt holes, the five lugs shown being disposed radially within the bolt hole circle and circumferentially between bolt hole locations.

Figure 3:
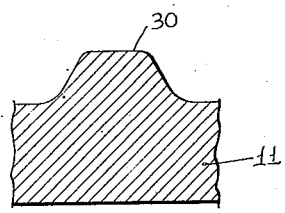
Fig. 3 is a partial section taken on the line 3—3 of Fig. 1.
Figure 2:
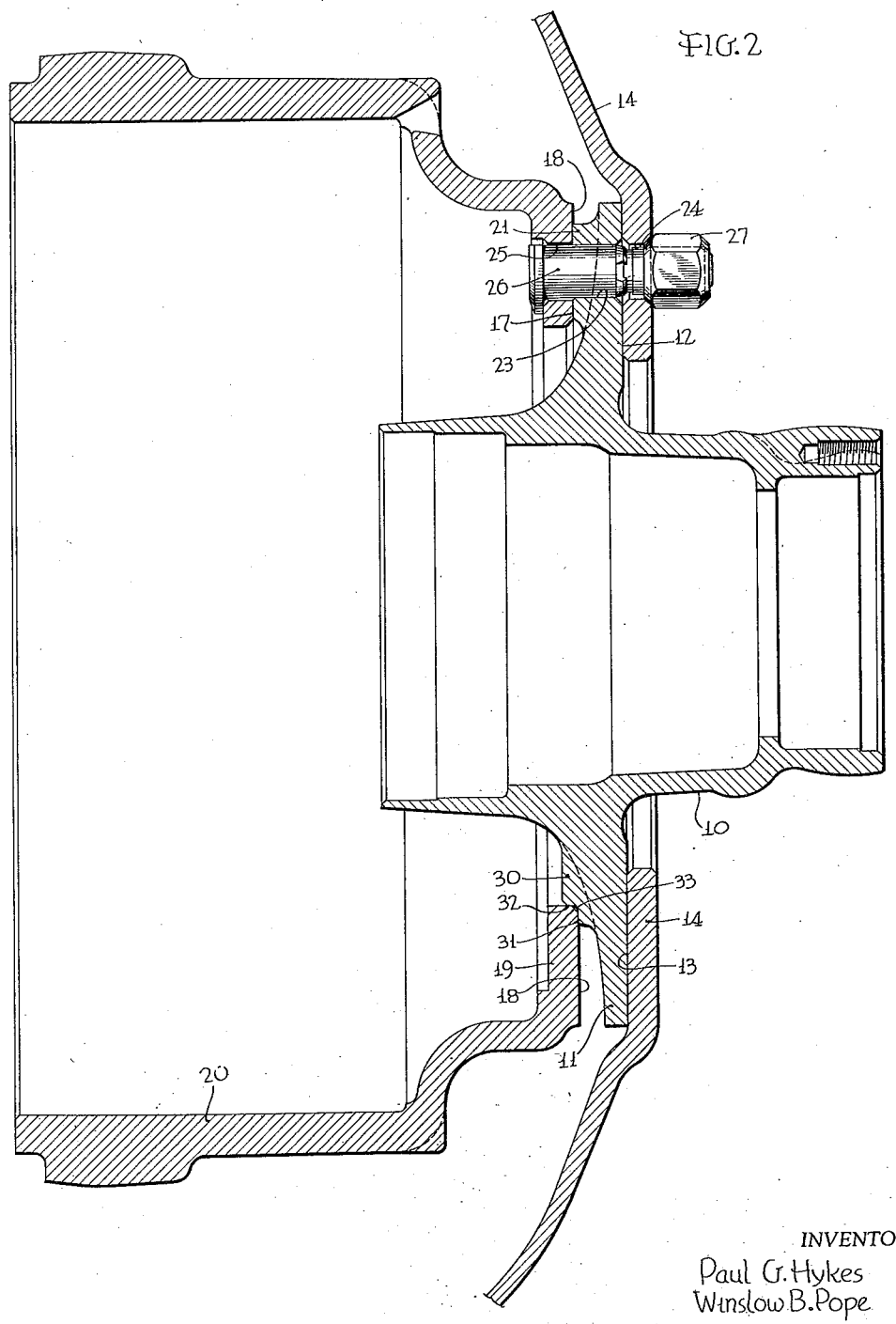
Fig. 2 is a section taken on the line 2—2 of Fig. 1 and including the wheel disk and brake drum.

As shown in Fig. 3, the positioning lugs have gently sloping sides where they connect with the drum flange whereby to spread the circumferential loads into the flange and minimize sharp corners which would concentrate stresses and start cracks.

It is thus seen that the invention provides an improved construction which greatly reduces the likelihood of fatigue failure under the heavy loads imposed in locating and anchoring brake drums.

While one embodiment of the invention has been described for purposes of illustration, it is to be understood that there may be various embodiments within the scope of the invention.

What is claimed is:

A wheel hub for supporting a wheel disk and brake drum, comprising an annular flange on the hub having generally flat radial surfaces on opposite sides for a wheel disk and brake drum respectively, the flange having an annular series of holes for the attaching bolts of the disk and drum, raised annular bosses around the bolt holes, the bosses having radial surfaces at their ends lying in a common radial plane to seat the radial surface of an attached disk, and a plurality of separate disk piloting lugs rising locally from the radial surface of the flange on the same side as the bosses at the bolt holes, the piloting lugs being arranged in an annular series within the annular zone of the bolt holes and each lug being located circumferentially between two adjacent bolt hole locations, the piloting lugs having radial disk engaging surfaces lying in a common plane with the radial disk engaging surfaces of said hole bosses and also having axially extending surfaces lying in a concentric circle for piloting the inner annular surface of a disk, the piloting lugs being of such limited size and located at such distance radially and circumferentially from the bolt holes as to be out of the zones of heavy stress concentration around the bolt holes, and the flange surface at the locations between piloting lugs extending in smooth lines from the bolt hole bosses to the hub.

References Cited in the file of this patent

UNITED STATES PATENTS

| | | |
|---|---|---|
| 1,896,821 | Keller | Feb. 7, 1933 |
| 2,482,378 | Sinclair | Sept. 20, 1949 |

FOREIGN PATENTS

| | | |
|---|---|---|
| 1,010,066 | France | Mar. 12, 1952 |